Figure 1:
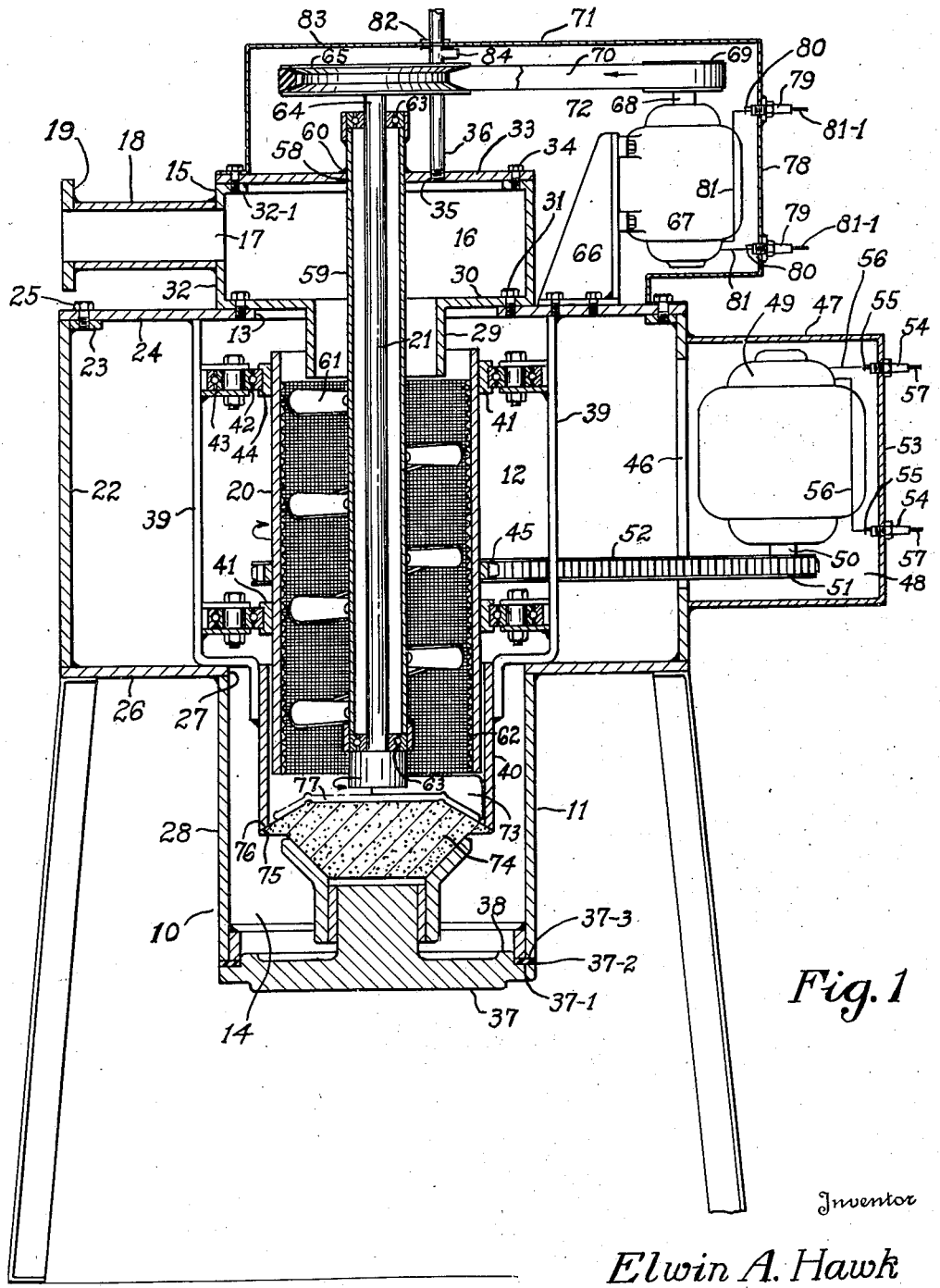

Inventor
Elwin A. Hawk
By Frease and Bishop
Attorneys

March 29, 1949.  E. A. HAWK  2,465,450
APPARATUS FOR FORMING ARTICLES
OF PLASTIC MATERIALS
Filed Sept. 26, 1945  3 Sheets-Sheet 2

Elwin A. Hawk
By Frease and Bishop
Attorneys

March 29, 1949.  E. A. HAWK  2,465,450
APPARATUS FOR FORMING ARTICLES
OF PLASTIC MATERIALS Filed Sept. 26, 1945  3 Sheets-Sheet 3

Inventor
Elwin A Hawk
By Frease and Bishop
Attorneys

Patented Mar. 29, 1949

2,465,450

UNITED STATES PATENT OFFICE 2,465,450

APPARATUS FOR FORMING ARTICLES OF PLASTIC MATERIAL

Elwin A. Hawk, East Rochester, Ohio

Application September 26, 1945, Serial No. 618,661

6 Claims. (Cl. 25—22)

The invention relates to apparatus for forming articles of plastic material, and particularly for forming dishes including plates and saucers and the like from a ceramic body.

In usual methods of dish manufacture, each dish is formed on a plaster of Paris mold from a ceramic mixture made up predominant'y of clay which is passed through a filter press in a plastic condition. From the filter press the plastic ceramic body is pugged in a pug mill, frequently under vacuum or subatmospheric pressure. The clay body is delivered from the pug mill in the shape of a round column or roll which is delivered to a jiggering room where it is further processed on a batting out bench.

In the batting out process a small chunk of clay is pulled by hand from the roll and put on a plaster of Paris block and hit with a plaster of Paris mallet, until the chunk is flattened to a thin slab, which is taken from the block by hand and placed on a plaster of Paris mold.

The batting out process above described is the usual and older process and has been improved by various methods and apparatus from time to time. After the slab of the ceramic body is placed on the mold, the mold with the slab is put on a rotary horizontal disk, and a rotary surface forming tool having the profile of the dish is passed over the slab at a distance from the mold equal to the thickness of the dish or part. The profiled steel tool which forms the bottom surface of the dish or part, removes excess of the plastic body and forms a smooth profiled surface which is usually the bottom of the dish or part, and this forming operation is known as jiggering.

Usual methods of dish manufacture may be further summarized as including: first the preparation of the ceramic body; second, the batting out of a thin slab of the body on a mold; third, jiggering the slab on the mold; fourth, after the jiggering the formed dish is dried; and fifth, the dried formed disk is then fired.

In usual dish manufacture all of the steps are performed at atmospheric pressure except the pugging of the body which may be done at sub-atmospheric pressure, such as by the use of the methods and apparatus set forth in my prior U. S. Patents Nos. 2,289,264 and 2,333,565.

The objects of the present invention include the provision of apparatus for directly forming an article such as a dish or ceramic part from a plastic body such as a ceramic body without intermediate operations, as usually carried out.

Further objects of the present invention include the provision of plastic and particularly ceramic article forming apparatus in which the parts are of simplified construction and arrangement, whereby the parts may be rapidly and economically manufactured, and easily and correctly assembled and disassembled, so that the apparatus as a unit may be economically produced and maintained.

The foregoing and other objects are attained by the plastic article forming apparatus, parts, combinations, and sub-combinations which comprise the present invention and the nature of which is set forth in the fo'lowing general statement, and preferred embodiments of which are set forth in the following description, and which are particularly and distinctly pointed out and set forth in the appended claims forming part hereof.

The nature of the improved methods of the present invention may be stated in general terms as including forming on a mold subjected to sub-atmospheric pressure, a successive series of thin layers of a plastic body laid one upon the other so that because of the sub-atmospheric pressure the successive thin layers of the plastic body knit together in a homogeneous mass as a formed article. In particular the body may be a plastic ceramic body, and the formed article may be a dish.

Furthermore, after the dish or other article is so formed on the mold by building up successive thin layers of the plastic body, the dish or other article and the mold are preferably dried together in a sub-atmospheric pressure.

The nature of the improved ceramic forming apparatus for carrying out the improved methods of the present invention may be stated in general terms as including improvements of the apparatus set forth in my said prior U. S. Letters Patent No. 2,289,264 and 2,333,565, whereby ingredients for the plastic body such as a plastic ceramic body are fed directly into a sealed wall chamber, where a column of the ceramic body is subjected to a sub-atmospheric pressure, and subsequently a plurality of thin layers of the ceramic body are built up and preferab'y profiled by a rotating jiggering or forming tool on a mold, die, or the like, the entire operation of building up the dish or other formed article being accomplished in a sub-atmospheric pressure by the preferably rotating and profiling blade tool.

Figure 2:
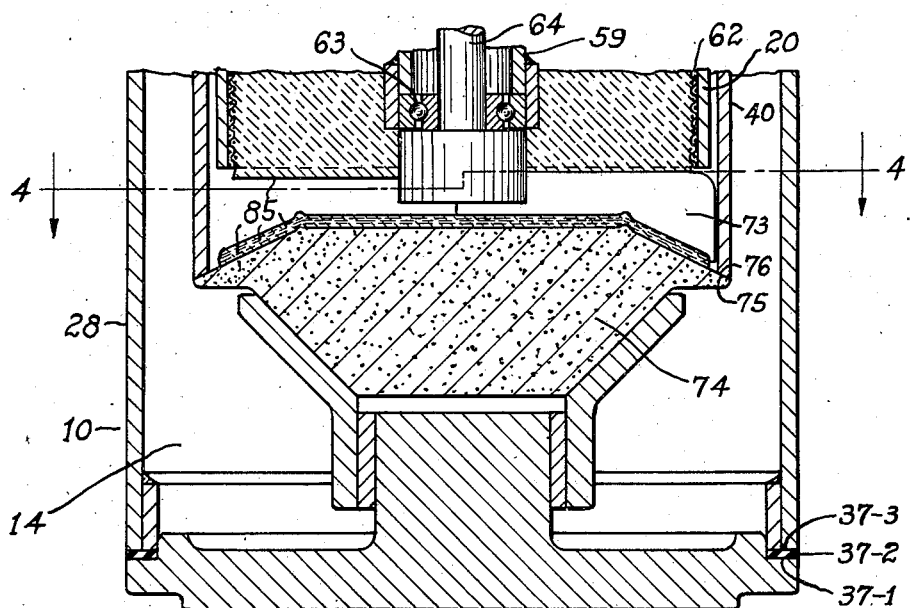
Figure 3:
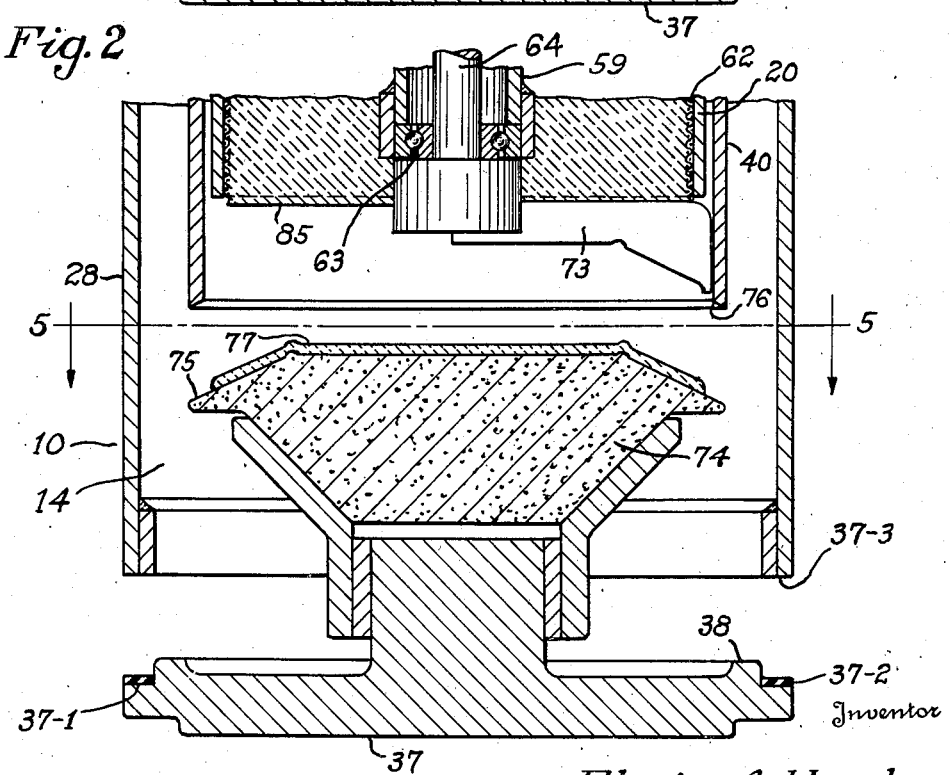
Figure 4:
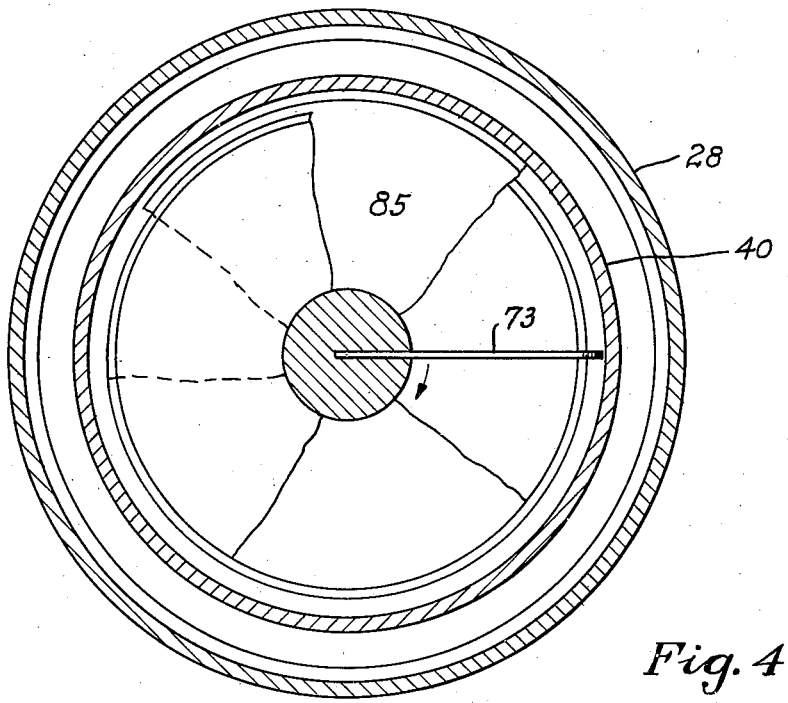

By way of example, preferred embodiments of the improved plastic article forming apparatus of the present invention and of improved parts thereof are illustrated in the accompanying drawings forming part hereof, in which Figure 1 is a vertical sectional view, as on the vertical axis of rotation of the jigger shaft and blade, of one embodiment of the improved plastic article forming apparatus, the apparatus being shown empty of plastic material for purposes of clearly illustrating all the parts;

Fig. 2, an enlarged view similar to Fig. 1 showing the lower portions of the improved apparatus in use during the forming of a plate on the mold by the rotating jigger blade operating on a descending mass of a ceramic body;

Fig. 3, a view similar to Fig. 2 showing a plate completely formed on the mold, and the mold separated from its sealing tubes;

Fig. 4, a horizontal sectional view as on line 4—4, Fig. 2; and

Figure 5:
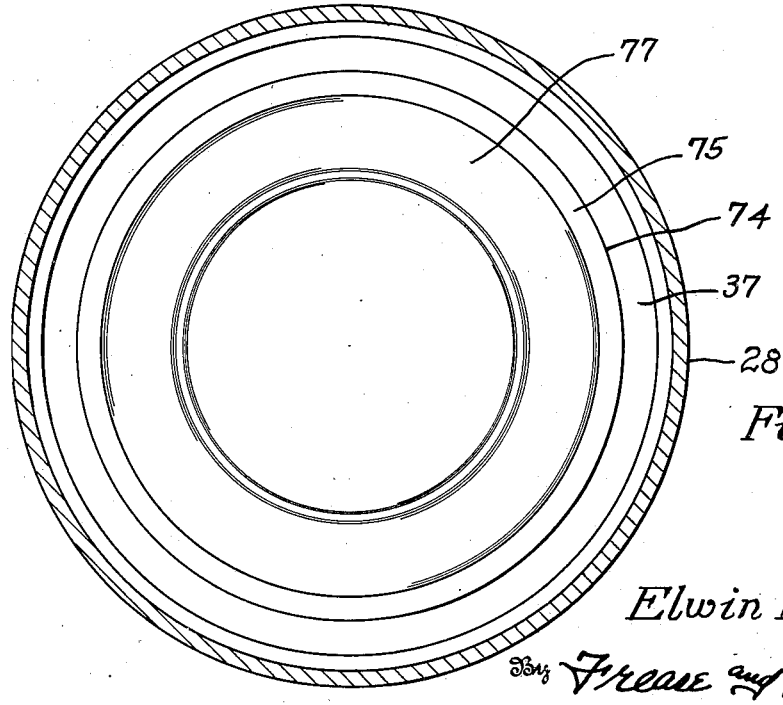

Fig. 5, a horizontal sectional view as on line 5—5, Fig. 3.

Similar numerals refer to similar parts throughout the drawings.

One embodiment of the improved plastic material forming apparatus of the present invention is indicated generally by 10, and includes gas sealed walls indicated generally by 11, which form a main chamber 12 having an upper intake opening 13 and a lower discharge opening 14 alined with the upper intake opening 13.

Walls indicated generally by 15 form an antechamber 16 above and communicating with the intake opening 13 of the main chamber 12. A side wall of the antechamber 16 has a side intake opening 17 formed therein, and the border of the opening 17 is connected with the inner end of a material supply tube 18 having an outer flange 19 which may be connected with the discharge tube of a pug mill, not shown; whereby plastic material such as a ceramic body in the pug mill and its discharge tube constitutes a gas seal for the supply tube 18, the antechamber 16, and the communicating upper end of the main chamber 12, in a manner similar to that set forth in my U. S. Patent No. 2,333,565.

The lower discharge opening 14 of the main chamber 12 is provided with gas sealing means hereinafter set forth in detail, and within the gas sealed main chamber 12, a pressure treatment tube indicated generally by 20 is mounted for rotation about an upwardly and downwardly extending axis indicated by the dot-dash line 21, and which preferably and as shown is a vertical axis.

The pressure treatment tube 20 is preferably as shown cylindric, and its length is preferably greater than its diameter, and the longitudinal center axis of the tube 20 is preferably offset and parallel with the axis of rotation 18, and the tube 20 thus rotates about the eccentric axis 21 with respect to its own longitudinal center axis, in a manner similar to that set forth in my said U. S. Patent No. 2,333,565.

The walls indicated generally by 11 forming the main chamber 12 include as shown, upper rectangularly arranged side walls 22 having at their upper ends inwardly extending rectangularly arranged flanges 23. The top wall for the chamber 12 as shown is a separable rectangular plate 24 seated upon the upper faces of the flanges 23, and separably secured thereto as by headed screws 25, and the intake opening 13 is formed in the top wall 24.

At the lower end of the rectangularly arranged chamber side walls 22 is secured a rectangular bottom wall 26 having a preferably circular opening 27 formed therein which is concentric with the vertical axis 21. From the lower face of the chamber bottom wall 26 and about the opening 27 depends a preferably cylindrical tube 28.

A preferably cylindric intake tube 29 preferably extends from the intake opening 13 of the main chamber 12 into the upper opening of the pressure treatment tube 20, and as shown the intake tube 29 has an upper outwardly extending flange 30 which is located within the antechamber 16 and fits upon the upper face of the main chamber top wall 24 about the intake opening 13, and the intake tube flange 30 is secured to the top wall 24, as by headed screws 31.

The walls 15 of the antechamber include side walls 32 having upper inwardly extending flanges 32—1 upon the upper faces of which is seated an antechamber top wall 33 which is separably secured to the flanges 32—1, as by headed screws 34. At one side of the antechamber top wall 33 there is formed an opening 35 which as shown is tapped, and has screwed therein the threaded end of an evacuating tube 36 which extends to and communicatingly connects with a pump not shown, which for the particular purposes of the present improvements is a vacuum pump.

The telescoping intake tube 29 and the upper end of the pressure treatment tube 20 may have interposed therebetween material blocking and clearing means, not shown, such as set forth in my prior U. S. Patent No. 2,333,565.

At the lower end of the depending tube 28, where the discharge opening 14 is located, the improved apparatus 10 includes a separable mold mounting and sealing plate 37 having an outer annular upper face portion 37—1, which may have a sealing washer 37—2 seated thereon, and either the annular sealing face portion 37—1 of the plate 37 or the washer 37—2 of rubber or the like seated on the annular face portion 37—1, separably seal fits against the annular lower end sealing face 37—3 of the tube 28. As shown, the sealing plate 37 may be provided with an upwardly extending cylindric pilot flange 38 which fits in the lower end of the bore of the tube 28.

From the main chamber top wall 24 depend a plurality of preferably vertical bars 39, and from the lower ends of the bars 39 depends, within the tube 28, a forming chamber and a mold seat tube 40. The pressure treatment tube 20 is surrounded by the bars 39, and the lower end of the pressure treatment tube 20 extends into the tube 40. Longitudinally spaced with respect to the axis 21, the pressure treatment tube 20 has located and secured on its outside, a pair of track rings 41, each having formed therein an externally opening annular channel track 42.

There are at least three of the depending bars 39, and on each bar 39 for each track ring 41 there is mounted a ball bearing 43 having an outer race ring 44 located within and rolling in the channel track 42 of the associated track ring 41. The mounting of each ball bearing 43 on its bar 39 is preferably eccentrically adjustable with respect to its vertical axis, as set forth in detail in my said U. S. Patent No. 2,333,565.

Between the track rings 41, there is mounted on the outside of the pressure treatment tube 20 a sprocket ring 45, and one of the main chamber side walls 22 has a chain opening 46 formed therein which is enclosed by walls indicated generally by 47 forming a gas sealed motor compartment 48 communicating through the chain opening 46 with the main chamber 12. In the gas sealed motor compartment 48 there is mounted an electric motor 49 having a vertical drive shaft 50 on the lower end of which is secured a sprocket pinion 51, and a chain belt 52 provides a driving connection between the motor sprocket pinion 51 and the pressure treatment tube sprocket ring 45.

For providing a gas sealed electrical connection of the motor 49 with an external source of electric power, side wall 53 of the motor compartment 48 has two threaded apertures formed therein in each of which is screw and seal mounted a usual internal combustion engine spark plug 54, and the insulated center electrode 55 of each spark plug is connected by a conductor 56 with one of the terminals of the motor winding within the compartment 48. The external binding post 57 of the center electrode of each spark plug is connected with one conductor not shown of an electric power line including suitable control switches for starting and stopping the motor 49.

The top wall 33 of the antechamber 16 has formed therein a central circular opening 58 whose center coincides with the axis 21 and through which extends an elongated bearing and blade mounting tube 59, which fits the circular opening 58, and has a gas sealed joint connection therewith as by an annular arc weld 60. The tube 59 extends above the top wall 33 and also below the top wall 33, through the antechamber 16, the intake tube 29, and the pressure treatment tube 20.

The tube 59 is stationary and on its outside below the intake tube 29 and within the pressure treatment tube 20 are mounted a plurality of feed screw blades 61 which are longitudinally and radially spaced from each other and each of which has angled faces lying in a helix. The pressure treatment tube is preferably lined with a cylindric tubular screen 62.

A ball bearing 63 is mounted at each end of the tube 59, one of the ball bearings 63 being at the upper end of the tube 59 above the antechamber top wall 33 and the other ball bearing 63 being at the lower end of the tube 59 within the pressure treatment tube 20.

A jigger shaft 64 extends through the bores of and has a pressure fit with the inner race rings of the ball bearings 63.

On the upper end of the jigger shaft 64 above the upper end of the tube 59 there is secured a V pulley wheel 65. At one side of the antechamber walls 15, there is mounted on the top face of the main chamber top wall 24 a motor mounting bracket 66, on which is mounted a motor 67 having a vertical shaft 68 on the upper end of which is secured a V drive pulley 69, and a resilient V drive belt 70 drive connects the V drive pulley 69 and the V pulley wheel 65.

Walls indicated generally by 71 form with the top wall 24 of the main chamber 12 a gas sealed compartment 72 for the motor 67 and its drive connection with the shaft 64. At the lower end of the jigger shaft 64 immediately below the lower end of the pressure treatment tube 20 a jigger blade 73 extends radially above a mold 74, which as illustrated is a plate mold, extending upwardly and mounted upon the sealing plate 37. The plate mold 74 has an outer conical peripheral portion 75 which seals against the conical lower end face 76 of the tube 40. The top of the mold 74 within the peripheral ring portion 75 has the conformation for one side face of the plate 77 which is jigger formed on the mold 74 by the rotating jigger blade 73.

The motor 67 within the compartment 72 is provided with a gas sealed electrical connection with an external source of electric power through the side wall 78 of the compartment 72 by a pair of usual internal combustion engine spark plugs 79, and the insulated center electrode 80 of each spark plug 79 is connected by conductor 81 with one of the terminals of the motor winding. The external binding post 81—1 of the center electrode of each spark plug 79 is connected with one conductor not shown of an electric power line including suitable control switches for starting and stopping the motor 67. The evacuating tube 36 extends through a gas sealed joint 82 in one of the walls of the compartment 72, as shown the top wall 83, and within the compartment 72 the evacuating tube 36 as shown has an inlet nipple 84 for evacuating the compartment 72.

In operating the improved plastic material forming apparatus 10, the supply tube 18 receives a sealing plug column of a ceramic body from the pug mill, not shown, with which the outer flange 19 is connected, and material from the advancing column of the ceramic body drops through the antechamber 16, the intake tube 29 and into the pressure treatment tube 20, which is rotated by the motor 56. The ceramic body material dropping into the rotating pressure treatment tube 20 piles up therein and forms an advancing plug seal 85 (Figs. 2, 3 and 4) at the bottom end of the tube 20 above the jigger blade 73. The vacuum pump connected with the evacuating tube 36 produces a sub-atmospheric pressure in the tubes 28 and 40 sealed by the sealing plate 37 and mold 74, respectively. The blades 61 coacting with the rotating pressure treatment tube 20 cause the advance of the homogenized and degasified plug seal 85 at the bottom of the pressure treatment tube 20.

Operation of the motor 67 rotates the jigger shaft 64 and the jigger blade 73, the jigger blade 73 scraping off thin sectors of ceramic body from the advancing plug seal 85, as best shown in Fig. 2. These thin sectors of degasified ceramic body pile up in layers on the mold 74 and are worked by the rotating jigger blade 73 into the form of the plate 77.

The upper portion of the jigger blade 73 operates as a scraper for scraping off or removing the thin sectors of ceramic body from the advancing plug seal 85. The lower portion of the jigger blade 73 is profiled for forming the layers of clay body on the mold 74. It is obvious that the upper and lower portions of the one-piece jigger blade 73 as shown, may be separate members.

By reason of the sub-atmospheric pressure in the tube 40, the layers of the clay body worked by the jigger blade 73 on the mold 74 merge with each other in a solid homogenized mass having the desired shape of the plate 77. After a suitable number, and relatively few rotations of the jigger blade 73, the formed plate 77 is ready to be removed after turning off the vacuum pump connected with the evacuating tube 36 which releases the atmospheric pressure pushing against the sealing plate 37 and holding it in position during the jiggering operation.

Fig. 5 shows the sealing plate 37 and the mold 74 thereon with the formed plate 77 of the ceramic body on the mold 74, as they are being separated by being pulled downwardly from the tubes 40 and 28.

Preferably the entire apparatus 10 may be operated in an evacuated room, by workmen provided with suitable sources of oxygen supply, or otherwise, whereby the green plates 77 or other shapes formed by the apparatus 10 may be dried very rapidly by means of suitable heat supplied into the evacuated room enclosing the apparatus 10.

The embodiments of the improved apparatus and the method steps described herein are by way of example, and the scope of the present invention is not limited to the same or to the particular details thereof, but is commensurate with any and all novel subject matter contained herein which may at any time properly under the patent laws be set forth in the claims hereof or originated herein, and the elements of any such claims are intended to include their reasonable equivalents.

I claim:

1. Apparatus for forming articles of plastic material including walls forming a gas sealed chamber, some of the walls including a downwardly opening tube having a lower end and a sealing plate separably fitting and sealing the lower end of the tube, a mold within the chamber and on the sealing plate, the mold having an upper face, a forming blade operatively mounted for movement in the chamber adjacent the upper face of the mold, means for producing a sub-atmospheric pressure and gas content within the chamber, and gas sealed means for introducing plastic material into the chamber for being worked between the forming blade and the mold.

2. Apparatus for forming articles of plastic material including walls forming a gas sealed chamber, some of the walls including a downwardly opening tube having a lower end and a sealing plate separably fitting and sealing the lower end of the tube, a mold within the chamber and on the sealing plate, the mold having an upper face, a jiggering blade operatively mounted for rotation in the chamber adjacent the upper face of the mold, means for producing a sub-atmospheric pressure and gas content within the chamber, and gas sealed means for introducing plastic material into the chamber for being worked between the jiggering blade and the mold.

3. Apparatus for forming articles of plastic material including walls forming a gas sealed chamber, some of the walls including a downwardly opening tube having a lower end and a sealing plate separably fitting and sealing the lower end of the tube, a mold within the chamber and on the sealing plate, the mold having an upper face, a forming blade operatively mounted for movement in the chamber adjacent the upper face of the mold, means for producing a sub-atmospheric pressure and gas content within the chamber, gas sealed means for introducing a mass of plastic material into the chamber, and means in the chamber for removing layers of the plastic material from the mass so as to drop on the mold for being worked between the forming blade and the mold.

4. Apparatus for forming articles of plastic material including walls forming a gas sealed chamber, some of the walls including a downwardly opening tube having a lower end and a sealing plate separably fitting and sealing the lower end of the tube, a mold within the chamber and on the sealing plate, the mold having an upper face, a jiggering blade operatively mounted for rotation in the chamber adjacent the upper face of the mold, means for producing a sub-atmospheric pressure and gas content within the chamber, gas sealed means for introducing a mass of plastic material into the chamber, and means in the chamber for removing layers of the plastic material from the mass so as to drop on the mold for being worked between the jiggering blade and the mold.

5. Apparatus for forming articles of plastic material including walls forming a gas sealed chamber, some of the walls including a tube having an open end and a sealing plate separably fitting and sealing the open end of the tube, a mold within the chamber and on the sealing plate, the mold having a forming face, a forming blade operatively mounted for rotation in the chamber adjacent the forming face of the mold, means for producing a sub-atmospheric pressure and gas content within the chamber, and gas sealed means for introducing plastic material into the chamber for being worked between the forming blade and the mold.

6. Apparatus for forming articles of plastic material including walls forming a gas sealed chamber, some of the walls including a tube having an open end and a sealing plate separably fitting and sealing the open end of the tube, a mold within the chamber and on the sealing plate, the mold having a forming face, a forming blade operatively mounted for rotation in the chamber adjacent the forming face of the mold, means for producing a sub-atmospheric pressure and gas content within the chamber, and gas sealed means for introducing a mass of plastic material into the chamber, and means in the chamber for removing layers of plastic material from the mass for being worked between the forming blade and the mold.

ELWIN A. HAWK.

REFERENCES CITED

The following references are of record in the file of this patent:

UNITED STATES PATENTS

| Number | Name | Date |
| --- | --- | --- |
| Re. 20,460 | Jeffery | Aug. 3, 1937 |
| 1,739,981 | Miller | Dec. 17, 1929 |
| 1,765,804 | Preston | June 24, 1930 |
| 2,013,026 | Bowling | Sept. 3, 1935 |
| 2,165,671 | Ward | July 11, 1939 |
| 2,290,916 | Smith et al. | July 28, 1942 |
| 2,301,939 | Fischer | Nov. 17, 1942 |